United States Patent [19]

Hediger et al.

[11] Patent Number: 5,051,642
[45] Date of Patent: Sep. 24, 1991

[54] APPARATUS FOR FIXING THE WINDING ENDS OF A STATOR WINDING IN A DYNAMO-ELECTRICAL MACHINE

[75] Inventors: Daniel Hediger, Othmarsingen; Hans-Werner Stankowski, Neuenhof, both of Switzerland

[73] Assignee: Asea Brown Boveri Ltd., Baden, Switzerland

[21] Appl. No.: 567,790

[22] Filed: Aug. 15, 1990

[30] Foreign Application Priority Data

Sep. 20, 1989 [CH] Switzerland ............ 3426/89

[51] Int. Cl.$^5$ .................................... H02K 3/46
[52] U.S. Cl. ............................. 310/260; 310/91
[58] Field of Search ............... 310/51, 91, 180, 194, 310/208, 214, 254, 260, 270, 271

[56] References Cited

U.S. PATENT DOCUMENTS

| 3,988,625 | 10/1976 | Jáger et al. | 310/260 |
| 4,126,799 | 11/1978 | Iogansen et al. | 310/260 |
| 4,238,339 | 12/1980 | Khutoretsky et al. | 310/260 |
| 4,379,243 | 4/1983 | Dailey et al. | 310/260 |
| 4,800,314 | 1/1989 | Ward et al. | 310/260 |
| 4,942,326 | 7/1990 | Butler et al. | 310/260 |
| 4,950,934 | 8/1990 | Holly | 310/260 |

FOREIGN PATENT DOCUMENTS

| 619216 | 4/1961 | Canada | 310/270 |
| 540785 | 12/1931 | Fed. Rep. of Germany . | |
| 1463796 | 3/1969 | Fed. Rep. of Germany . | |
| 1613125 | 1/1971 | Fed. Rep. of Germany . | |
| 2150163 | 9/1979 | Fed. Rep. of Germany | 310/260 |
| 1408666 | 7/1965 | France . | |
| 2320653 | 3/1977 | France . | |
| 2329094 | 5/1977 | France . | |
| 161939 | 8/1933 | Switzerland . | |
| 371648 | 5/1973 | U.S.S.R. | 310/260 |

*Primary Examiner*—Steven L. Stephan
*Assistant Examiner*—Dennis R. Haszko
*Attorney, Agent, or Firm*—Oblon, Spivak, McClelland, Maier & Neustadt

[57] ABSTRACT

For fixing the winding ends (1, 2, 3, 4) of a stator winding in a dynamoelectrical machine, in which the winding ends have inner (2, 3) and outer layers (1, 4), which are mechanically and electrically connected to each other at the axially outer end, the winding ends are clamped between an outer ring (14) and an inner ring (15). The bracing of the two rings (14, 15) and of said winding ends is performed by filling pieces (16) being inserted between two neighboring winding ends (1, 2) in the circumferential direction of the winding overhang, of which filling pieces at least some are wedged in the radial direction with the two rings (14, 15) by means of retightenable wedges (17, 18).

This clamping produces a rigid winding overhang, the wedging can be retightened if required and also disassembled without any great effort.

15 Claims, 4 Drawing Sheets

APPARATUS FOR FIXING THE WINDING ENDS OF A STATOR WINDING IN A DYNAMO-ELECTRICAL MACHINE

BACKGROUND OF THE INVENTION

1. Field of the Invention

The invention relates to an apparatus for fixing the winding ends of a stator winding in a dynamoelectrical machine, in which the winding ends have inner and outer layers which are mechanically and electrically connected to each other at the axially outer end, consisting of an outer ring and an inner ring, means for connecting the two rings to each other, means for bracing the two rings and said winding ends and means for fastening the outer ring to the end face of the stator laminated core.

The invention makes reference in this respect to a prior art as emerges for example from German Offenlegungsschrift 1,613,125 or German Auslegeschrift 1,463,796.

2. Discussion of Background

The fastening of the winding ends of the stator windings (winding overhang) of turbo-generators presents certain problems due to the great demands to which these winding overhangs are subjected. These demands originate from the effects of electromagnetic forces, in particular in the event of a short-circuit, from vibrations and from differing thermal expansions of the stator bars in relation to the stator iron during operation.

In the case of the apparatus for fixing the winding ends of a stator winding in an electrical machine according to German Offenlegungsschrift 1,316,125, an outer ring externally hugs a part of the outer layers of the winding ends. An inner ring, which is independent of the outer ring, acts on the inner layers of the winding ends. To prevent mutual axial displacement of the two rings, devices designed as C-shaped clips are provided, which grip around the winding ends to connect the two clips. The two rings are screwed to axially running holders, which for their part are fastened to the end face of the stator laminated core.

In the case of the axially movable and radially fixed winding overhang holder for the stator winding of a turbo-generator according to German Auslegeschrift 1,463,796, the winding overhangs are spaced apart by means of wedges and intermediate pieces and held in place between two concentric insulating rings. In this arrangement, the outer insulating ring is fixed in relation to parts of the frame in radial direction by means of sliding wedges, which allow an axial displacement of the outer insulating ring upon thermal expansion of the winding overhang, and is connected to the stator frame by means of flexible parts.

The winding overhang holder according to U.S. Pat. Specification No. 4,800,314 corresponds by and large to that according to German Auslegeschrift 1,463,796, but uses only an outer ring. The winding overhang ends are wedged and bonded among themselves in groups and connected to this outer ring by means of bands.

SUMMARY OF THE INVENTION

Accordingly, one object of this invention is to provide a fixing of the generic type mentioned at the beginning which can be produced cost-effectively and easily, reliably withstands all operational stresses of the type mentioned and, furthermore, not only permits the retightening of the support but also virtually intact disassembly.

This object is achieved according to the invention by filling pieces being inserted between two neighboring winding ends in the circumferential direction of the winding overhang, of which pieces at least some are wedged in the radial direction with the two rings by means of wedges.

The advantage of the invention is to be seen in particular in that the entire winding overhang forms an intrinsically rigid structure up to its end. The bracing forces do not act directly on the comparatively sensitive connections between the inner and outer winding layers. Furthermore, the space required is very small, because it is determined only by the outside diameter of the outer ring or the inside diameter of the inner ring. A further advantage is the good accessibility of the bracing and the possibility of retightening the entire holder, or disassembling it, without great effort.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a cutout of a view in radial cross-section of the two rings with conductor bars lying in between;

DESCRIPTION OF THE PREFERRED EMBODIMENTS

Figure 1:
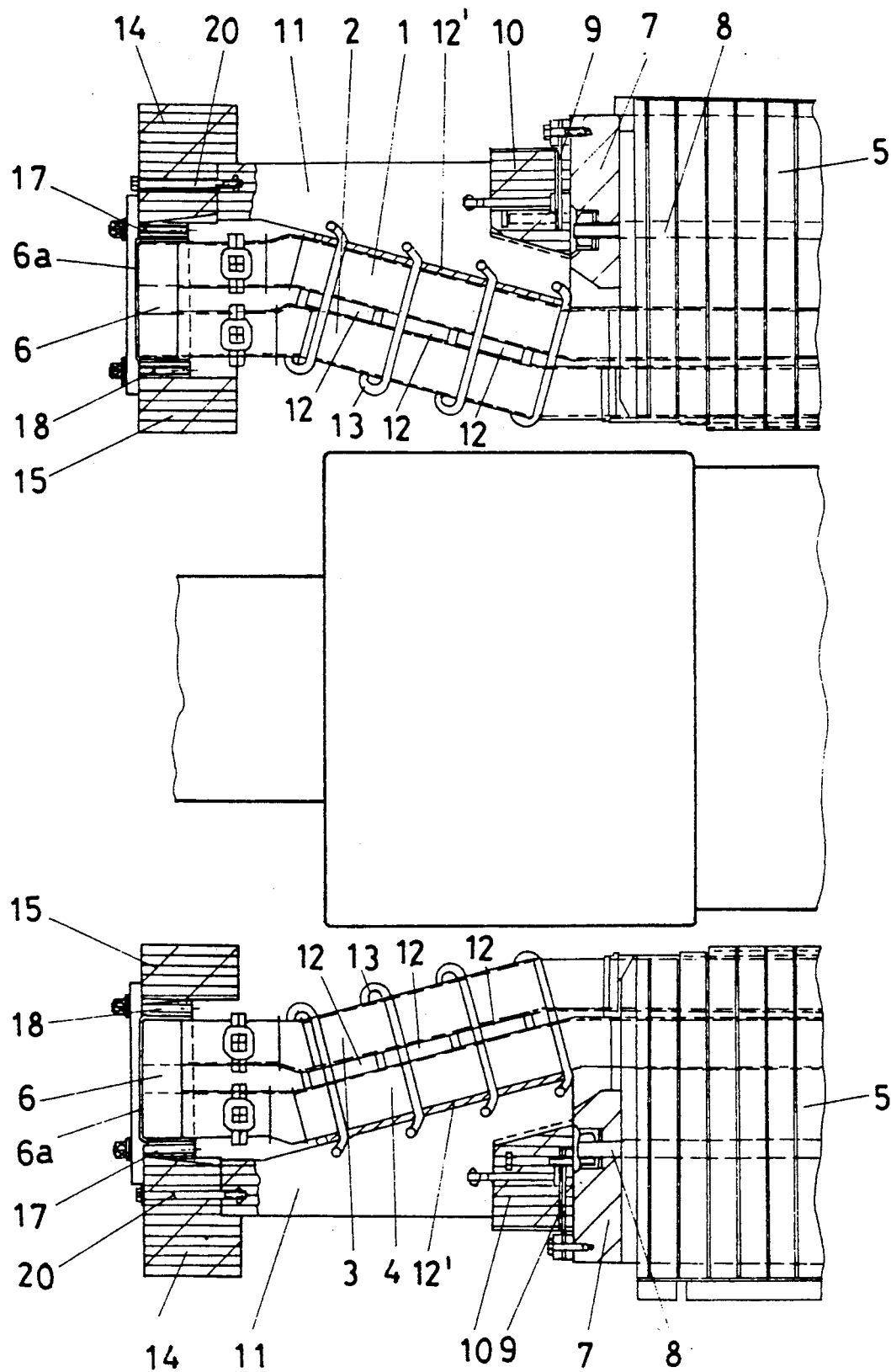
FIG. 1 shows an illustrative embodiment of the invention in the form of a simplified longitudinal section through the end portion of a turbo-generator.
Figure 3:
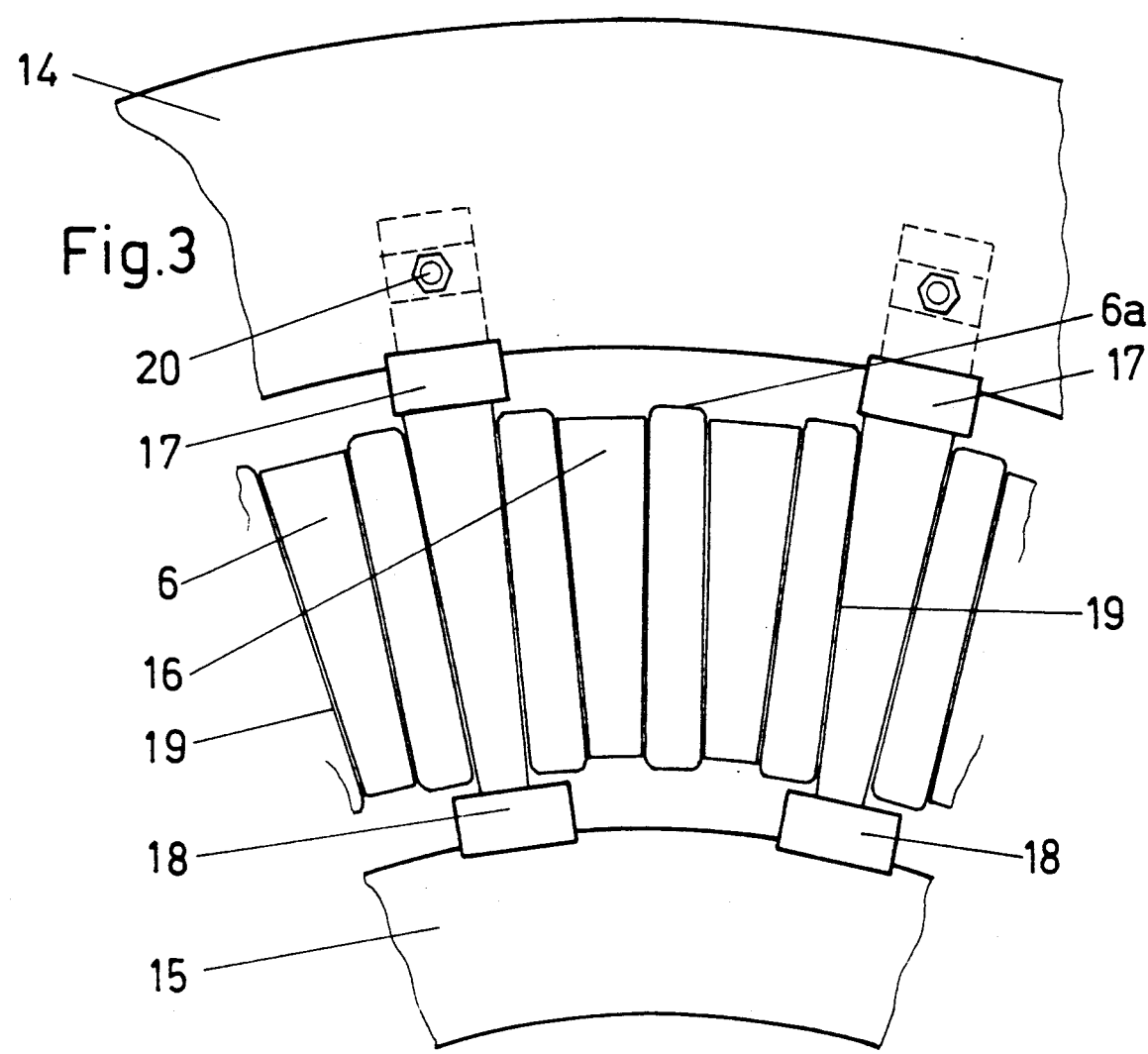
Figure 2:
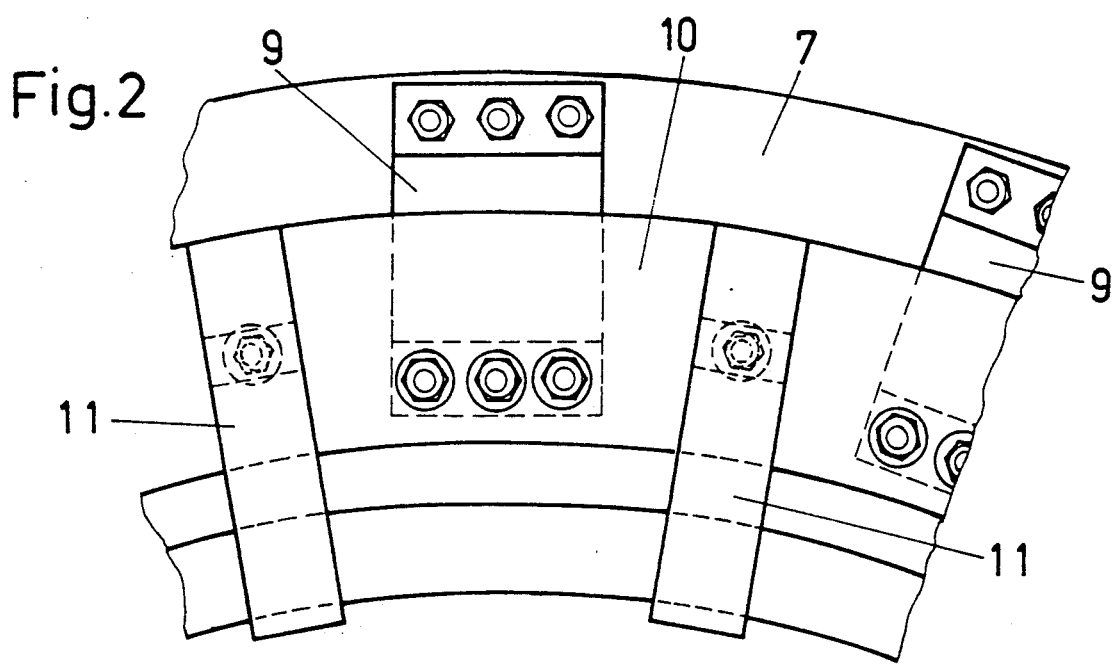
FIG. 2 shows a cutout of a view of the winding overhang of the machine according to FIG. 1, from which the resilient suspension of the winding overhang on the stator laminated core can be seen.

Referring now to the drawings, wherein like reference numerals designate identical or corresponding parts throughout the several views, FIG. 1 shows two connector bars 1, 2 and 3, 4 respectively of a stator winding, which bars lie in one and the same groove of a stator laminated core 5. At the ends, the bars 1 and 2 or else 3 and 4 are each connected mechanically and electrically to each other by a metallic plate 6 and are electrically insulated by caps 6a of insulating material. The stator laminated core 5 is axially braced in a known way by means of stator pressing plate 7 and tie-bolt 8. Leaf springs 9, which are directed radially inwards in circumferentially even distribution are fastened to the stator pressing plate 7 and act on a supporting ring 10. In turn, axially directed cross members 11 of glass fiber-reinforced plastic are screwed onto said supporting ring 10 and their inner contour approximately follows the outer contour of the winding overhang (cf. detailed view of FIG. 2). With spacers 12, 12' inserted in between the superjacent conductor bars 1, 2 and 3, 4 respectively and between the outer conductor bars 1 and 4 respectively and the cross members 11, the conductor bars are fastened to the cross members 11 by means of synthetic resin-impregnated glass fiber cords 13. The suspension of the winding overhang on the leaf springs 9 allows axial relative movements between the stator winding and the stator laminated core. To this extent, the construction described of the turbo-generator corresponds to the prior art.

According to the invention, the outermost ends of the conductor bars 1, .., 4 of a stator winding overhang are indirectly wedged between an outer ring 14 of glass fiber-reinforced plastic, which is fastened by means of bolts 20 to the cross members, and an inner ring 15 of the same material, the inner ring 15 being fastened to the outer ring 14 in a way still to be described. This will be explained further with reference to FIGS. 2 to 6.

In this simplified partial view of the end face of the winding overhang, cross-sectionally approximately trapezoidal filling pieces 16 are inserted in each case between two neighboring conductor bar ends connected by the plates 6. Said filling pieces consist of glass fiber-reinforced synthetic resin or another insulating material having corresponding mechanical strength. Said pieces fill the space between two neighboring conductor ends 6 essentially completely in the circumferential direction. In the radial direction, on the other hand, in the case of the example there are inserted between every third filling piece 16 and the inner ring 15 and between every third filling piece 16 and the outer ring 14 wedges 17 and 18 respectively, which can be retightened from the outside and will be further described in more detail. For fixing the conductor bar ends and the filling pieces 16 in the circumferential direction, there are inserted in each case flexible nonwoven inserts, for example glass fiber nonwoven inserts 19, which are (can be) impregnated with synthetic resin once wedging has been carried out.

There are a number of possibilities available for wedging, of which the one which at present appears to be technically appropriate has been shown in detail in FIGS. 4 to 8.

Figure 4:
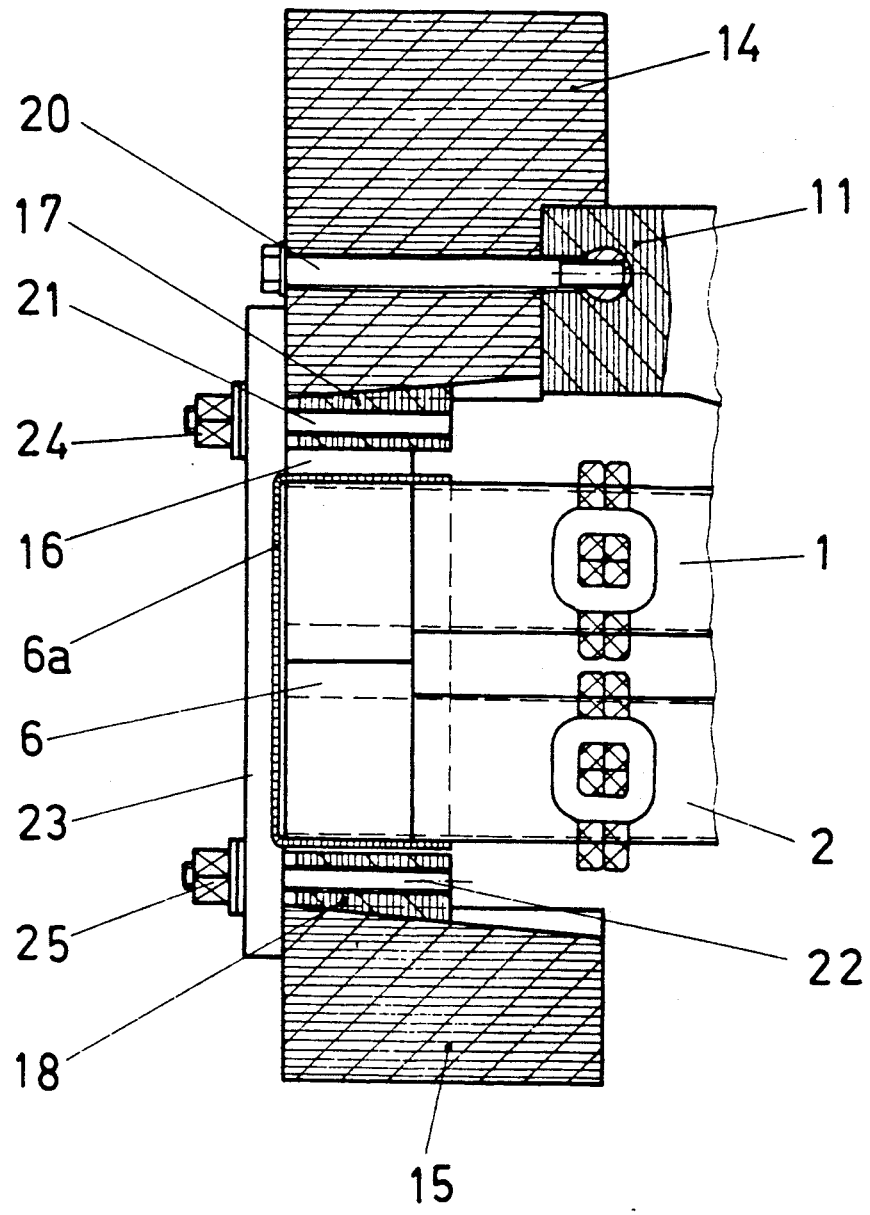
FIG. 4 showa a first illustrative embodiment of wedging accessible from the outside.

In the illustrative embodiment according to FIG. 4, the mutually facing surfaces of the rings 14 and 15 are beveled, so that the space between the two rings widens conically toward the stator laminated core. These surfaces form the wedge surfaces, which interact with the wedge surfaces of the wedges 17 and 18. The opposite surfaces of the wedges 17 and 18 run approximately axially parallel and bear against the filling piece 16. The wedges 17 and 18 are provided with a stud bold 21 and 22 respectively. A plate 23 serves as abutment for the stud bolts 21 and 22. As clearly evident from FIG. 4, even in the tightened state, the wedges do not reach as far as the plate 23, in order to permit retightening of the wedges by retightening of the nuts 24, 25. It is also evident from FIG. 4 that it is not the conductor bar ends of the bars 1 and 2 enclosed by the cap 6a that are braced, but only the filling pieces 16 in relation to the two rings 14 and 15. The caps, which are comparatively sensitive to mechanical loads, in particular in the radial direction, are only stressed by the arch pressure in the circumferential direction.

In wedging, the procedure is that the inner wedges 18 are first tightened slightly, and only then are the outer wedges 17 tightened. In this way, on account of the wedging effect of the cross-sectionally trapezoidal filling pieces 16, a force acting in the circumferential direction is also exerted during tightening of the wedges 17 on the conductor assembly and the filling pieces 16 lying in between.

Due to the conicity of the mutually facing wedge surfaces of the rings 14 and 15 and on account of the fact that the plate 23 rests at least partially on both rings 14, 15, an axial fixing of the inner ring 15 is obtained.

Figure 5:
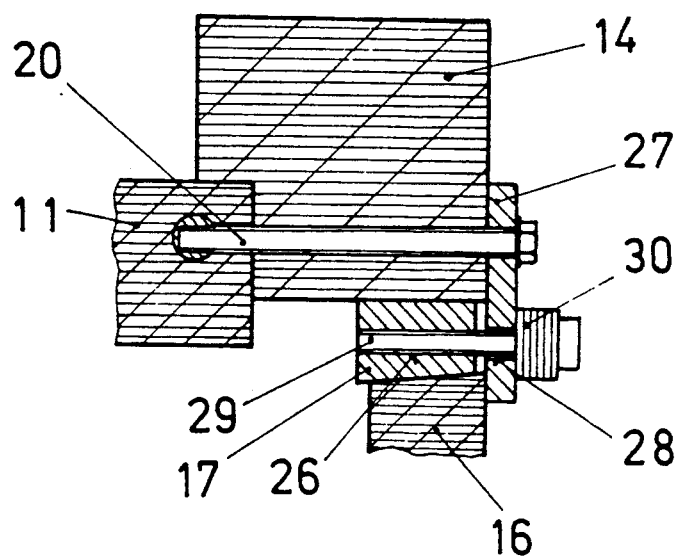
FIG. 5 shows a second illustrative embodiment of wedging accessible from the outside.

In the embodiment of the ring wedging according to FIG. 5, the wedge 17 is provided with a threaded bore 26. Also fastened under the fastening bolt 20 of the outer ring on the cross member 11 is a plate 27, which reaches radially inward until over the filling piece 16. A screw bolt 29 with a set of disk springs 30 is passed through a bore 28 in said plate 27 and screwed into the threaded bore 26. In contrast to the bracing according to FIG. 4, here the effective wedge surfaces are formed on the filling piece 16 and on the wedge 17.

Figure 6:
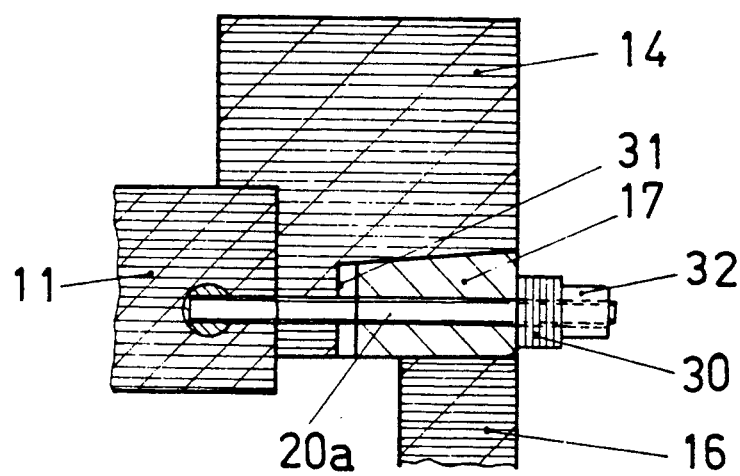
FIG. 6 shows a third illustrative embodiment of wedging accessible from the outside.

In the embodiment according to FIG. 6, the wedge 17 lies virtually completely in an annular recess 31 on the inside of the outer ring 14. The wedge surfaces are formed on the outer ring 14 and the wedge 17. The wedge 17 has an axially running bore, through which the fastening of the outer ring 14 on the cross member 11, which fastening is designed as stud bolt 20a, is passed. A set of disk springs 30, acting only on the wedge 17, and a nut serve for the tightening and automatic retightening of the wedging in operation.

Figure 7:
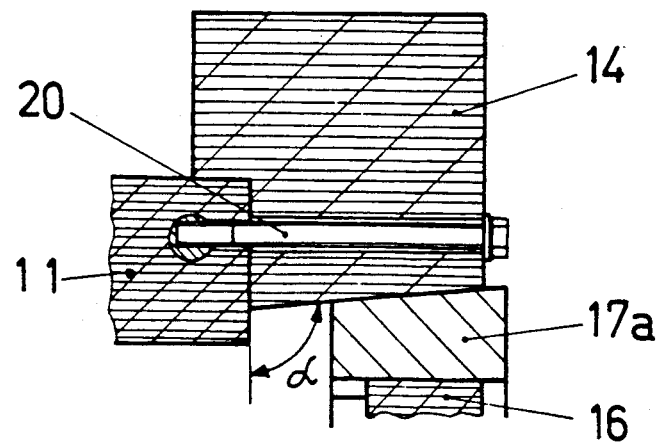
FIG. 7 shows a fourth illustrative embodiment of wedging accessible from the outside.

The wedging according to FIG. 7 utilizes a wedge 17a which can be knocked in from the outside. If required, the wedge 17a can be secured by a usual wedge securing means, which is fastened to the ring 14 or to the filling piece 16.

In FIGS. 5 to 7, only the wedging between the oute ring 14 and the filling piece 16 has been illustrated. It goe without saying that the wedging between the inner ring 15 and the filling piece 16 can be realized in a corresponding way, it being quite possible for various of the bracing means described to be combined with one another. Also, if required, a separate wedging between the filling pieces 16 and the inner ring 15 can be dispensed with, if correspondingly adapted inserts are used instead of the wedges 18, since the achievement of the desired arch pressure depends essentially only on the introduction of radially inwardly directed (wedge) forces.

Furthermore, in the case of the embodiments according to FIGS. 6 and 7, it should be noted that means for connecting the two rings 14 and 15 have to be provided, since here, in contrast to the embodiment according to FIG. 4, there is no plate (item 23 in FIG. 4) spanning the two rings. In the simplest case, said means consist of a radially running plate which is screwed to the two rings 14 and 15.

In the variant according to FIG. 5, the means for connecting the two rings 14 and 15 can be designed as a separate component, which is screwed to the two rings. However, it is simpler to lengthen the plate 27 in FIG. 7 in such a way that it reaches as far as the inner ring (not shown) and is screwed to the latter.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An apparatus for fixing winding ends of a stator winding in a dynamoelectrical machine, in which the winding ends have inner and outer layers, which are mechanically and electrically connected to each other at an axially outer end, comprising:
- an outer support ring;
- an inner support ring;
- means for connecting two inner and outer support rings to each other;
- means for bracing the inner and outer support rings and said winding ends; and
- means for fastening the outer support ring to an end face of a stator laminated core;
- wherein said means for bracing includes filling pieces inserted between two neighboring winding ends in the circumferential direction, said filling pieces being substantially trapezoidal in radial cross-section; and
- wherein said means for bracing further includes wedges movable in the axial direction to radially brace assigned ones of said filling pieces in the radial direction from at least one of said inner and outer support rings by means of retightenable wedges.

2. An apparatus as claimed in claim 1, wherein the outer support ring is fastened to cross members said cross members being arranged on a stator pressing plate.

3. An apparatus as claimed in claim 2, wherein the cross members are arranged on the stator pressing plate with radially directed leaf springs inserted in between.

4. An apparatus as claimed in one of the claim 1 to 3, wherein the filling pieces have a trapezoidal, radially inwardly tapering cross section.

5. An apparatus as claimed in claim 1, wherein said assigned ones of said filling pieces include every third and said filling piece, seen in the circumferential direction.

6. An apparatus as claimed in one of claim 1 or 5, wherein said assigned ones of said filling pieces are wedged from said outer support ring by a first wedge and from said inner support ring by a second wedge act in paris radially inward and outward on the filling pieces to which wedges are assigned.

7. An apparatus as claimed in one of claims 1 or 5, wherein only one of said wedges acts on each of said assigned ones of the filling pieces, said only one of said wedges being arranged between the outer ring and the assigned filling piece.

8. An apparatus as claimed in claim 7, wherein:
- a longitudinal axis passes through said inner and outer support rings;
- an interior surface of said outer support ring is inclined relative to said longitudinal axis; and
- a radially outward surface of each of said wedges is inclined relative to said longitudinal axis.

9. An apparatus as claimed in claim 7, wherein;
- a longitudinal axis passes through said inner and outer support rings;
- a radially outward surface of each of said assigned ones of the filling pieces is inclined relative to said longitudinal axis; and
- a radially inward surface of each of said wedges is inclined relative to said longitudinal axis.

10. An apparatus as claimed in claim 8, wherein screw bolts or stud bolts, which are supported at least on one of the inner and outer support rings via plates, are provided for bracing the wedges.

11. An apparatus as claimed in claim 10, wherein the screw bolts or stud bolts act via spring means on the wedges.

12. An apparatus as claimed in claim 6, wherein:
- a longitudinal axis passes through said inner and outer support rings;
- an interior surface of said outer support ring is inclined relative to said longitudinal axis;
- a radially outward side of said first packing wedge is inclined relative to said longitudinal axis;
- an exterior surface of said inner support ring is inclined relative to said longitudinal axis; and
- a radially inward side of said second packing wedge is inclined relative to said longitudinal axis.

13. An apparatus as claimed in claim 6, wherein:
- a longitudinal axis passes through said and outer support rings;
- a radially inward surface of said first packing wedge is inclined relative to said longitudinal axis;
- a radially outward side and a radially inward size of said assigned ones of said filling pieces are inclined relative to said longitudinal axis; and
- a radially exterior surface of said second packing wedge is inclined relative to said longitudinal axis.

14. An apparatus as claimed in claim 9, wherein screw bolts or stud bolts which are supported at least on one of the inner and outer support rings via plates, are provided for bracing the wedges.

15. An apparatus as claimed in claim 14, wherein the screw bolts or stud bolts act via spring means on the wedges.

* * * * *